United States Patent [19]

Gray

[11] Patent Number: 5,054,843
[45] Date of Patent: Oct. 8, 1991

[54] BONDED COMPOSITE INSULATED FLOOR CONSTRUCTION

[75] Inventor: Larry J. Gray, Charleston, Ill.
[73] Assignee: Trailmobile, Inc., Charleston, Ill.
[21] Appl. No.: 506,442
[22] Filed: Apr. 6, 1990
[51] Int. Cl.$^5$ ............................................. B62D 25/20
[52] U.S. Cl. .................................. 296/191; 296/24.1; 296/181; 296/182; 296/183; 296/204; 105/375
[58] Field of Search .................. 296/1.1, 24.1, 181, 296/182, 183, 191, 204, 901; 105/375, 422

[56] References Cited

U.S. PATENT DOCUMENTS

| | | | |
|---|---|---|---|
| 2,162,361 | 6/1939 | Sisson | 105/375 |
| 3,711,148 | 1/1973 | Hindin | 296/183 |
| 3,746,388 | 7/1973 | Robinson | 296/183 |
| 4,671,562 | 6/1987 | Broadbent | 296/183 X |

FOREIGN PATENT DOCUMENTS 248127 12/1987 European Pat. Off. ............ 296/182

Primary Examiner—Margaret A. Focarino
Assistant Examiner—Andrew C. Pike
Attorney, Agent, or Firm—Myers & Associates, Ltd.

[57] ABSTRACT

An insulating floor is composed of a deck, supporting plastic beams which are mounted on an underpan, the underpan being supported on metal crossing beams, the regions between the deck, plastic beams and underpan being filled with foamed plastic providing insulation and adhesively and mechanically bonding the components together.

14 Claims, 2 Drawing Sheets

BONDED COMPOSITE INSULATED FLOOR CONSTRUCTION

BACKGROUND OF THE INVENTION

1. Field of the Invention

The invention relates to a new floor construction particularly adapted to insulated vehicle bodies whereby substantially continuous top and bottom skins separated by insulating stringers are bonded together into a rigid insulating unit by expanded foam reacted in place, the foam adhesively and mechanically bonding the components together.

2. Description of the Prior Art

Various U.S. Patents describe solutions to insulated flooring problems which differ from the instant invention. Krug, U.S. Pat. No. 3,399,636, shows a insulated floor for a railroad car with elaborate intersticians of plates, beams, plywood sheets, wooden flooring, with an insulation between the flooring and plywood sheets, the entire structure being through bolted to impart structural integrity.

Kloote, U.S. Pat. No. 3,003,810, deals with the combination of foam sandwich panels together to form a unitized truck body. The skins comprise individual panels and are non-continuous. Only the solid elements between panels where the panels are joined together substantially are designed for joining as opposed to this invention's completely unitary, bonded design.

Lemon, U.S. Pat. No. 4,091,743, shows insulating foam between transverse stringers and with a floor extrusion above and a bottom member not described in the patent. Neither the shape, material, nor bonding arrangement is disclosed or suggested.

Stiglmaier, U.S. Pat. No. 4,352,520, uses a flanged support element with a vertical portion and a rivet extending completely through the support element from top to bottom, and passing completely through the central portion. This invention's use of fasteners is quite different as is the specific shape of the stringer and the bonding arrangement.

SUMMARY OF THE INVENTION

The instant invention provides a novel and improved means for insulating a refrigerated truck body or semi-trailer. As disclosed the foam filled insulative structure provides for a unitized floor. The disclosed structure, due to the placement and design of disclosed structural components, provides for a floor having superior strength and a more permissive fastening geometry than previous designs.

The objects of this invention listed below are indicative of improved performance the instant invention provides and other goals and advantages will become apparent in the detailed description of the instant invention and claims directed thereto.

OBJECTS OF THE INVENTION

One object of the invention is to provide a unitized insulated floor structure with superior insulating properties.

Another object of the invention is to provide a composite sandwich insulated floor structure having exceptional structural strength.

Another object of the invention is to provide stringers as structural elements in a composite sandwich insulated floor structure having a geometry which permits greater choices in placement of fasteners for improved strength and a wider fastening base than prior art stringers.

Another object of the invention is to provide for an increased sectional area of insulating foam within the composite sandwich structure and a reduced minimum sectional area for internal structural members.

Another advantage of the invention is to provide a floor construction with reduced weight while maintaining or increasing strength of the prior art.

Another advantage in the invention is the use of a stringer composed of a material with low effective thermal conductivity and thereby improving the insulating properties of the structure.

Another advantage in the invention is the avoidance of potentially deleterious affects of chemical preservatives for enhancing rot resistance over prior art wooden stringers and preventing deleterious effect in the use of dissimilar metal stringers adjoining an extruded floor element thereby promoting electrolysis and corrosion.

Another advantage is the use of a sandwich construction with components of enhanced dimensional stability by virtue of greater similarity in co-efficient of thermo expansion and co-efficient of expansion due to moisture content fluctuations.

Another advantage is the promotion of enhanced chemical adhesive bonding between components of the foam sandwich floor construction.

Another advantage is the use of component geometry which imparts increased mechanical bonding through a "tongue and groove" engagement between insulating foam and stringers.

The above and other objects and advantages of the invention are achieved by the provision of a floor construction formed of stringers positioned between an underpan and a floor member, the stringers, underpan and floor member together defining voids; an insulating foam filing these voids and mechanically bonding the stringers, underpan and floor members together; and transverse support members located below the underpan and connecting the floor construction to the vehicle framework.

DESCRIPTION OF THE PREFERRED EMBODIMENT

DETAILED DESCRIPTION OF THE DRAWINGS

Figure 1:
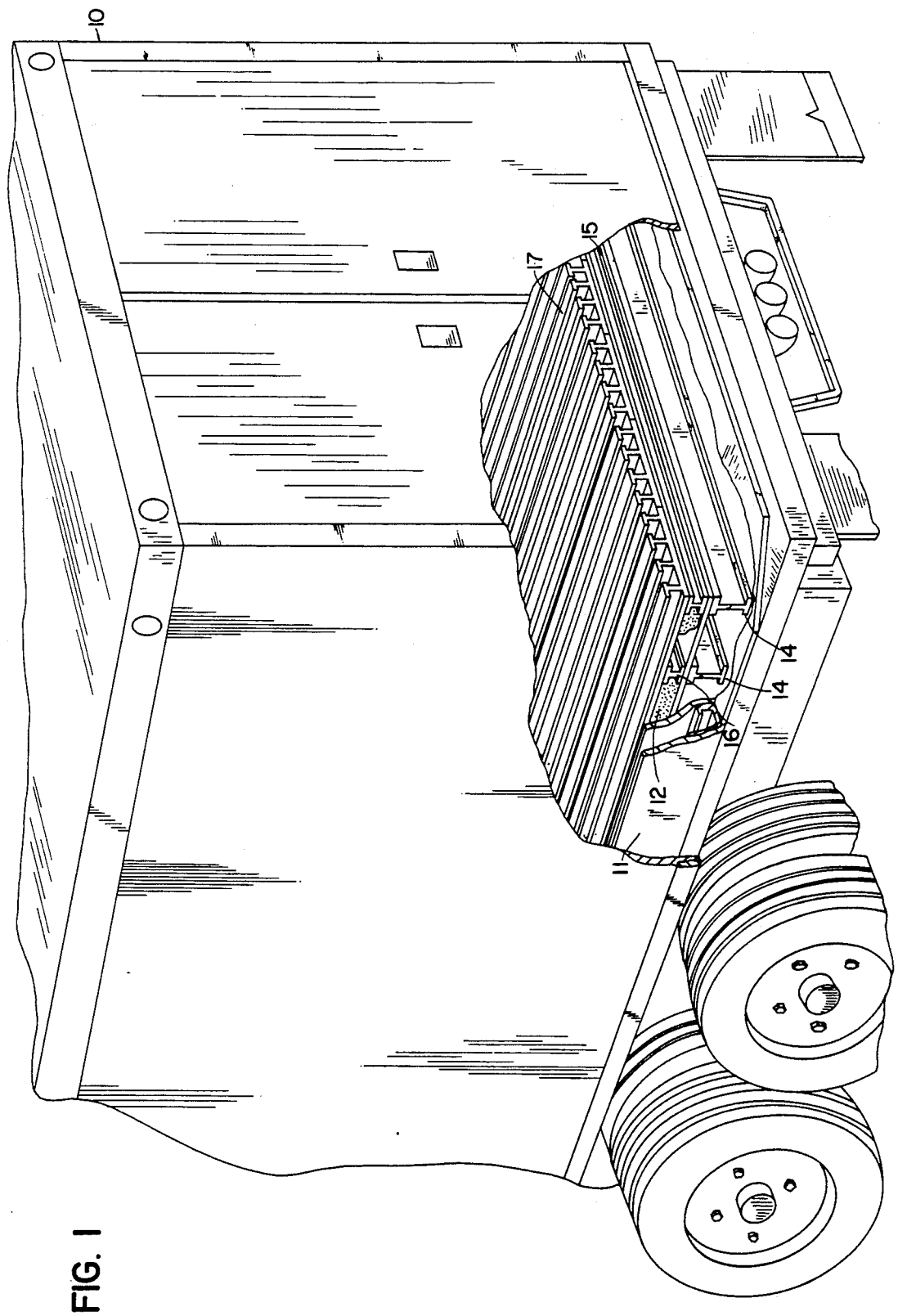
FIG. 1 is a perspective cut away view of a vehicle body showing the invention.

FIG. 1 is a perspective cut away view of a vehicle body (10) shown from the lower left rear corner in which the vehicle framework (11) can be seen to be supporting a composite sandwich insulated floor (12) on transverse support members (14) operative to support cargo (150). In the preferred embodiment the framework comprises interconnected body rails of a semi-monocoque trailer body. Use of the strength, weight, and durability advantages of the invention in other trailer embodiments such as a flat bed trailers is not precluded.

Typically the framework (11) and floor member (17) are metals in alloys which have high strength and fabrication advantages, but also high thermal conductivity. Improved insulation properties in a refrigerated trailer floor structure are particularly desirable.

The prevailing practice in the art is to use square section wooden stringers. A change in material from wood to a plastic such as polyvinyl chloride which is extruded, molded, or otherwise formed to a superior shape offers advantages and complementary properties. Even with a heat transfer coefficient slightly higher than the prior art wood rectangular section stringer, the effective cross-sectional area perpendicular to the longitudinal axis of the floor, the main direction of heat transfer, can be reduced, hence net heat transfer reduced. The maximum effective heat transfer occurs in a refrigerated trailer from the outside to the interior, substantially perpendicular to the longitudinal axis of the floor as a whole.

Figure 2:
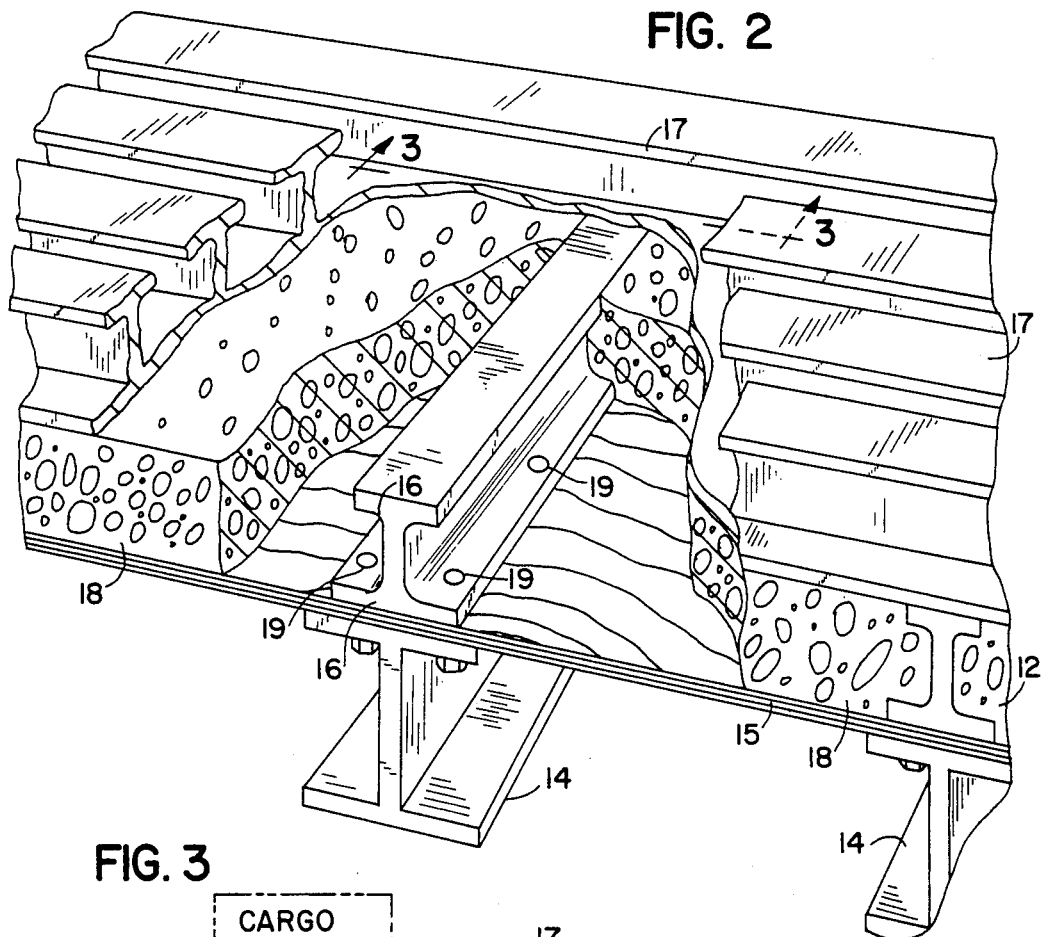
FIG. 2 is a perspective cut away side view of a portion of the floor structure.

FIG. 2 is a perspective cut away view of a portion of a floor structure looking from one side. Appearing in this view is the composite sandwich insulated floor (12) generally supported on transverse support member (14) a plurality of which compose a framework. Resting directly on the support member (14) is the underpan (15) which forms the bottom skin of the composite floor. In the preferred embodiment this is a fiber-reinforced plastic metal sheet. Other suitable sheets such as structural plastics and fiber-reinforced plastics metal may be used. Above the underpan is the transverse stringer (16) having a c-shaped interior section which supports a floor member or top deck section (17). In this composite then, the floor member forms a top skin, the underpan a bottom skin with the stringers as compression members, forming a rigid sandwich structure.

In the case of refrigerated trailers, the floor member (17) is typically composed of aluminum extrusions including "T", duct, or other hybrid sections whereby the load is supported above the floor to permit air circulation beneath the cargo. A flat floor forming this top skin is not precluded.

Mechanical fastening of floor to stringer assists fabricating in using screws in part as a clamping mechanism for foamed-in-place filling or insulation, as well as added mechanical fastening. The stringer or beam (16) is through fastened to the transverse support member (14) by fasteners (19) passing through the stringer, underpan (15) and transverse support member (14).

The space between underpan (15) and floor member (17) is filled with insulating foam (18). In the preferred embodiment, a chemically reacting polyurethane based compound which is introduced into the space or void in an unreacted state, then upon reaction expands to substantially completely fill the space or void defined by the underpan below, floor member above, and between stringers (16) and upon curing forms an integral unit therewith. This further enhances the rigid composite sandwich with the stringers operative, in addition to their structural role, as foam expansive dams.

Figure 3:
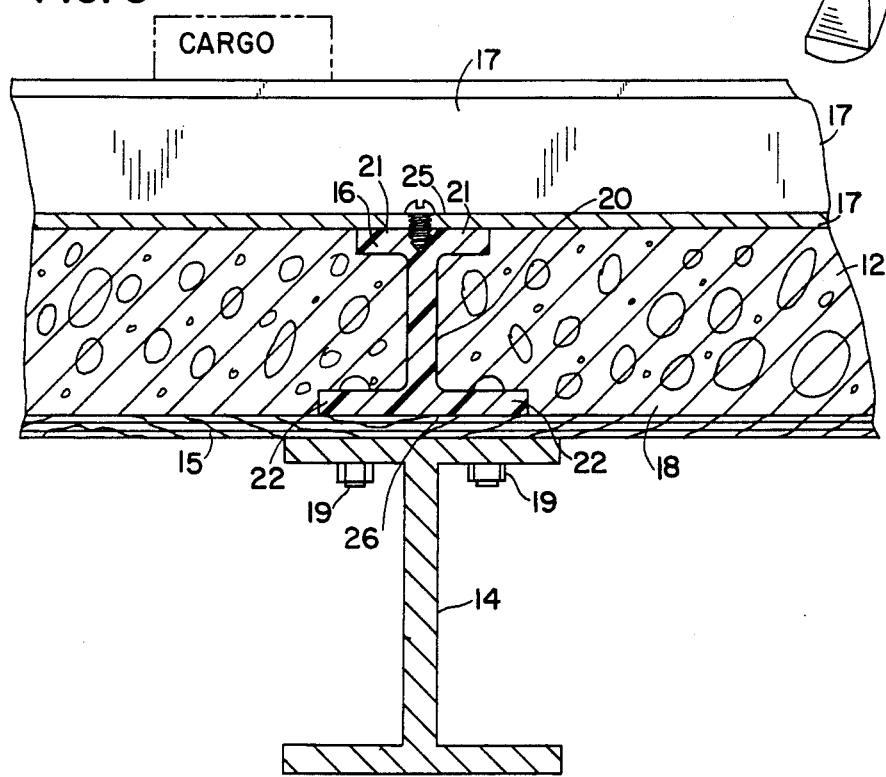
FIG. 3 is a sectional view of the floor structure substantially along Line 3—3 of FIG. 2.

FIG. 3 is a sectional view of a composite sandwich insulated floor (12) supported on a transverse steel support member (14). The underpan (15), stringer (16), floor member (17), and insulation (18) are all visible in this view.

The bottom fasteners may be placed in pairs, as shown, placed all on one side of the stringer (16), or staggered on alternating sides providing a wider fastener base with fewer fasteners than the prior art. In addition, the floor boards are screwed down to the stringer to provide additional strength, rigidity, and ease of assembly of the entire sandwich structure.

The formed structural plastic stringer (16) has two oppositely directed top flanges (21) extending from the top of a vertically oriented web (20) which in the preferred embodiment runs the length of the stringer. The base of the stringer comprises two oppositely directed flanges (22) extending perpendicular to the vertical web (20). The stringers are spaced longitudinally of the floor and define pockets therewith for the foamed filler material.

In the preferred embodiment the base comprising the two flanges (22) provided at the bottom of the web are compositely wider than the span across the top flanges (21). This provides several advantages, including: greater inherent stability purely due to the shape; separating fasteners a wider dimension apart from one another; and permitting access to the fasteners for driving or application of other fastening tools to secure the fasteners. Another advantage of a narrower top flange is a reduced tendency to roll as the floorboards flex under load.

It will be further noted that the top (25) and bottom (26) surfaces of the stringer are flat for better load bearing and easier fabrication and fitting while the interior portions where the flanges (21) intersect the web (20) and where the base (22) intersects the web (20) are radiused. In this plastic composite construction of the stringer, the placement of radii helps maintain structural integrity because of the difficulty in filling sharp corners with foam insulation and also reduces concentration of stresses and therefore shearing forces tending to displace the two components, here the foam filler (18) and stringer (16). Furthermore, as the foam insulation is adhesively bonded to the stringer, underpan and floor, the structure is free of fissures which a freezable liquid could fill and by expansion during freezing act to stress the components. It also has been determined that a substantially greater radius is desirable at the top, both providing greater support for the somewhat narrower surface (25) and to provide a more advantageous surface area to be filled by the foam as it expands horizontally and vertically during reaction. It will be noted while the foam formulations and application methods are designed to maximize foaming and minimize pooling of solid matter, by virtue of the action of gravity, the reacting medium tends to initially flow along the underpan (15) and expand upward.

In accordance with my invention I claim:

1. A composite sandwich floor for an insulated vehicle body comprising:
    a framework having transverse support members;
    an underpan above said transverse support members;
    floor means for supporting cargo, said floor means being disposed above said underpan;
    transverse stringer means interposed between said underpan and said floor means and fastened to said support members;
    said stringer means, said underpan, and said floor means defining a void therebetween; and
    expanded foam insulation means filling the void;
    said insulation means adhesively and mechanically bonding said underpan, said floor means, and said stringer means together into a unitary structure.

2. The invention according to claim 1, wherein
    said stringer means comprises a vertical web having a top and a bottom and extending a length of said stringer means;

a flange extending perpendicularly and outwardly from said web at the top thereof; and a base member extending perpendicularly and outwardly from said web at the bottom thereof;

said base member extending laterally outwardly farther than said flange for improved load distribution, stability, and fastener positioning.

3. The invention according to claim 2 wherein said web and said flange and said web and said base member respectively intersect with load-spreading radiuses for reducing stress concentrations and facilitating filling the void formed therebetween with said foam.

4. The invention according to claim 3 wherein said foam comprises a foamed-in-place, chemically reactive material introduced into the void in unreacted state, thereafter reactively expanded to fill the void, and cured to form a substantially integral unit.

5. The invention according to claim 4 wherein said floor means comprises extruded metal, and said stringer means being formed of structural plastic.

6. The invention according to claim 2 wherein said stringer means, said underpan, and said floor means comprising compatable components for adhesive bonding with said foam insulation to eliminate water-retaining fissures therebetween.

7. A floor structure for a vehicle comprising:

a metal top deck section, transverse stringers supporting said top deck section, an underpan below said stringers, metal transverse support members below said underpan in vertical alignment with said stringers, and filler means disposed between said underpan and said top deck section wherein said filler means is an insulation material and said insulation material is a foamed plastic.

8. The invention according to claim 7 wherein said filler means is bonded to said deck section, to said underpan, and to said support members to eliminate water-retaining fissures therebetween.

9. The invention according to claim 8 wherein said insulation material comprises a polyurethane-based plastic.

10. The invention according to claim 9 wherein said plastic completely fills the space between said underpan and said top deck section.

11. The invention according to claim 7 wherein said transverse stringers have top and bottom flanges of which said top flanges are narrower than said bottom flanges.

12. The invention according to claim 7 wherein said stringers are spaced longitudinally of said top deck section and define pockets therebetween, and said filler means filling said pockets.

13. The invention according to claim 7 wherein said filler means comprises a plastic foamed in situ and bonded to said stringers and said underpan.

14. A composite sandwich floor for an insulated vehicle body comprising:

a framework having transverse support members;

an underpan above said transverse members;

a floor deck for supporting cargo, said floor deck being disposed above said underpan;

a transverse stringer interposed between said underpan and said floor deck, and fastened to said support members;

said stringer, said underpan, and said floor deck defining a void therebetween; and said foam insulation means adhesively and mechanically bonding said underpan, said floor deck, and said stringer together into a unitary structure.

* * * * *